Nov. 6, 1956

J. M. PESTARINI 2,769,952

EXCITATION SYSTEM AND CONTROL THEREFOR

Filed June 30, 1953

2 Sheets-Sheet 1

INVENTOR
*Joseph M. Pestarini*
BY
*Philip D. Hilbert*
ATTORNEY

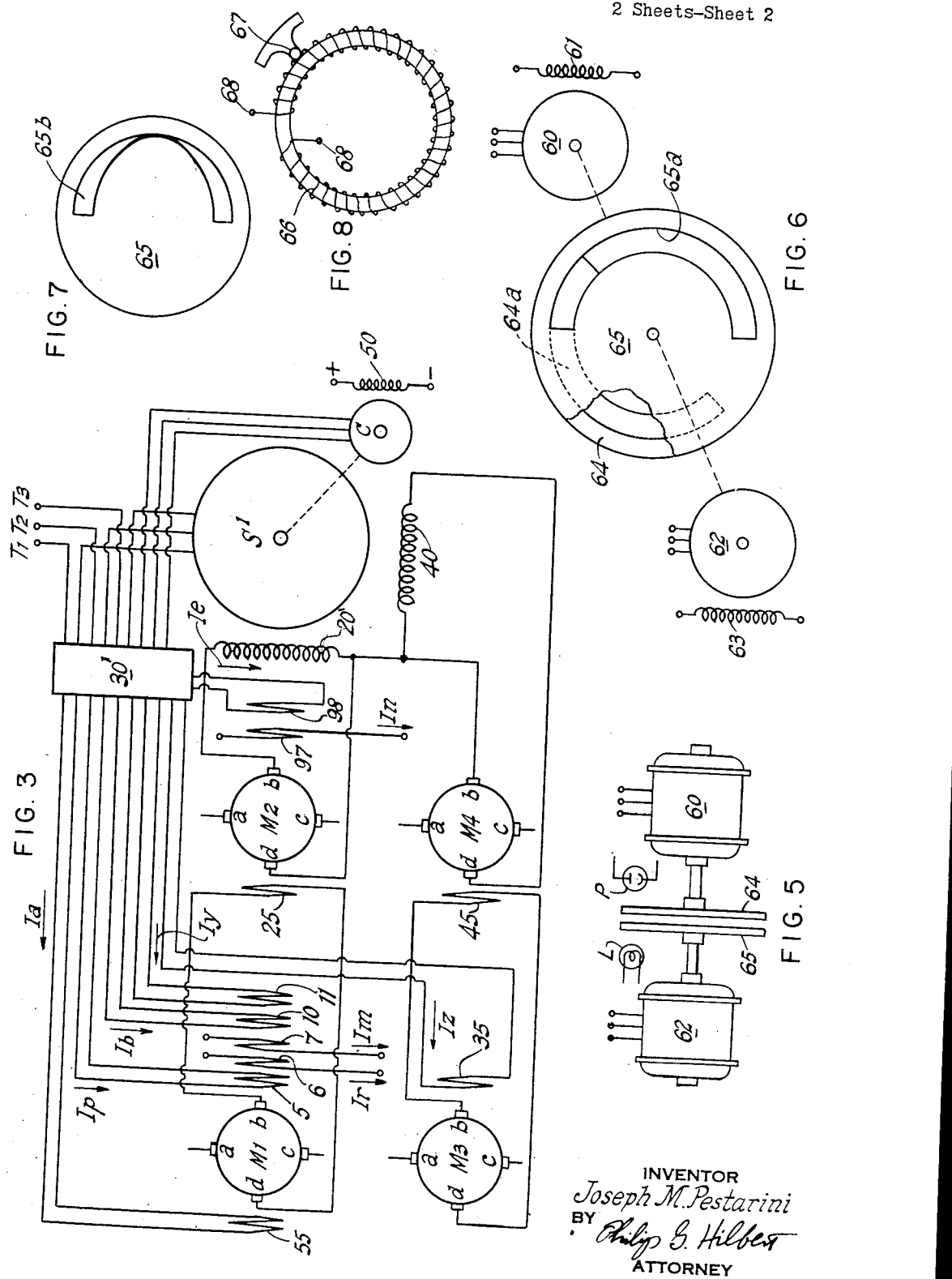

United States Patent Office 2,769,952
Patented Nov. 6, 1956

2,769,952
EXCITATION SYSTEM AND CONTROL THEREFOR

Joseph M. Pestarini, Staten Island, N. Y.

Application June 30, 1953, Serial No. 365,169

10 Claims. (Cl. 322—24)

This invention relates to excitation systems for large electrical machines and controls therefor.

Large electrical machines such as synchronous devices and machines provided with commutators, are conventionally excited by direct current supplied by a main exciter dynamo. As the controlling current for the main exciter involves small amounts of power, the exciter cannot be controlled directly and a small pilot exciter is used to control the main exciter by energizing the field of the main exciter.

One object of this invention is to provide an improved excitation system embodying pilot and main exciters of a type which lend themselves to precision control and insure proper excitation for the electrical machine.

Usually, in conventional excitation systems, the main exciter is a dynamo while the pilot exciter may take the form of a machine of the metadyne type known as the amplidyne. The present invention embodies main and pilot exciters in the form of metadynes which are interconnected in a manner to effect a rapid response in respect to the regulation of the output of the electrical machine controlled by the excitation system.

A further object of this invention is to provide improved control means for an excitation system with high sensitivity operating with minimum power.

The present invention is particularly applicable to synchronous machines such as generators and motors wherein the control thereof is rapid in response and accurate to a high degree thereby enhancing the stability of operation of the machine.

A further object of this invention is to provide an excitation system for an electrical machine having a plurality of exciting windings and including a tandem arrangement of pilot and main exciter metadynes for supplying precision controlled excitation current for each excitation winding.

Still another object of this invention is to provide in a system of the character described, means for deriving a current practically proportional to an accurately measured characteristic of the output of the electrical machine, another current proportional to a reference value, and a third current equal to difference between the first two currents, said currents being used for controlling the operation of the excitation system in an improved manner.

Figure 1:
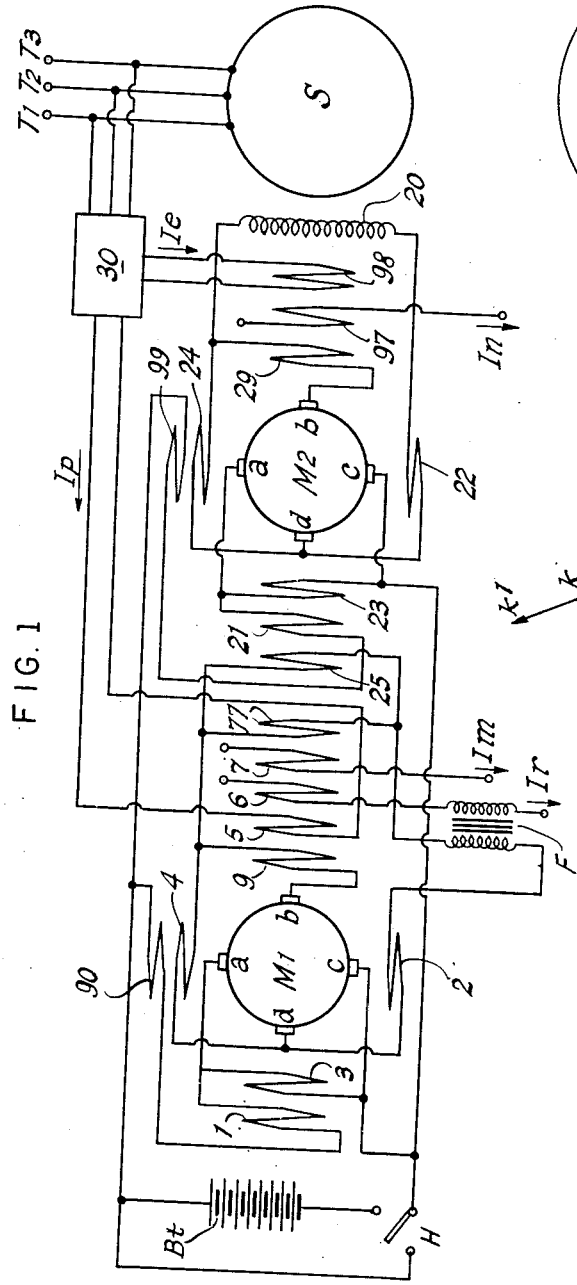
Figure 4:
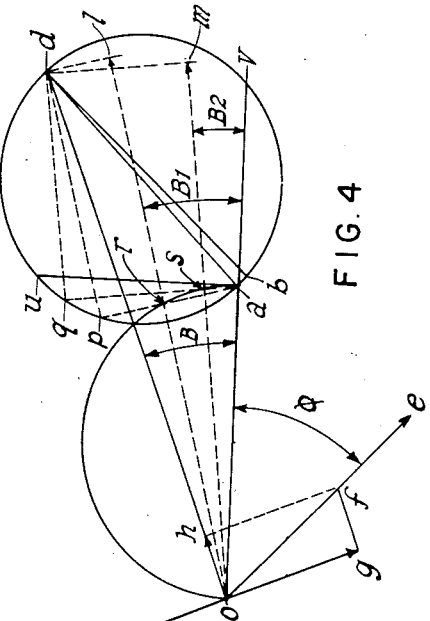
Figure 2:
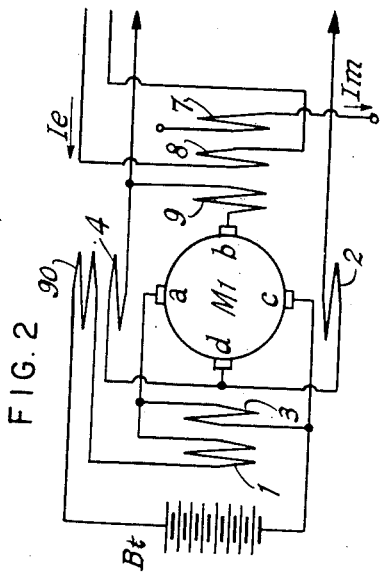

In the drawing; Fig. 1 is a circuit diagram of an excitation system embodying the invention; Fig. 2 shows modified connections of the pilot exciter metadyne portion thereof; Fig. 3 is a circuit diagram for an excitation system for a pair of field windings; Fig. 4 is a vectorial diagram explaining the operation of the system; Fig. 5 shows a motor arrangement for producing control currents for the system; Fig. 6 shows the arrangement of the rotating discs thereof; Fig. 7 shows a modified form of disc and Fig. 8 shows another means for producing control currents.

In Fig. 1 is shown a system embodying the invention and comprising a three phase synchronous electrical machine indicated at S and having an excitation winding 20 and output terminals $T_1$, $T_2$, $T_3$; a pilot exciter metadyne $M_1$ and a main exciter metadyne $M_2$.

The pilot exciter metadyne $M_1$ is arranged to operate as a transformer metadyne and comprises an armature having associated therewith a commutator with a pair of primary brushes $a$, $c$; and a pair of secondary brushes $b$, $d$. The metadyne $M_1$ further includes stator control windings 1, 3, 9, 5, 6, 7 and 77 having their magnetic axes coincident with the commutating axis of the secondary brushes $b$, $d$; and stator control windings 2, 4 and 90 having their magnetic axes coincident with the commutating axis of the primary brushes $a$, $c$.

The main exciter metadyne $M_2$ is also arranged to operate as a transformer metadyne and comprises an armature having associated therewith a commutator with a pair of primary brushes $a$, $c$; and a pair of secondary brushes $b$, $d$. The metadyne $M_2$ further includes a stator winding 25 connected to the output of pilot exciter metadyne $M_1$ through secondary brushes $b$, $d$ thereof; and stator windings 21, 23, 29, 97, 98, all with their magnetic axes coincident with the commutating axis of secondary brushes $b$, $d$ thereof. The metadyne $M_2$ further includes stator windings 22, 24 and 99 with their magnetic axes coincident with the commutating axis of the primary brushes $a$, $c$. The output of metadyne $M_2$ through brushes $b$, $d$ is supplied to excitation winding 20.

A constant voltage source such as battery $B_t$ is arranged for connection across the primary brushes $a$, $c$ of metadynes $M_1$ and $M_2$ through a two way switch H.

A device indicated as 30 is connected to the output of machine S and is adapted to provide a current $I_p$ which is practically proportional to the actual value of a characteristic of the output of machine S. Such current $I_p$ is supplied to stator winding 5 of the pilot exciter metadyne $M_1$. The device 30 is further adapted to provide a current $I_e$ which is almost proportional to an error current equal to the difference between a desired current value $I_r$ and the current $I_p$. The $I_e$ is supplied to stator winding 98 of the main exciter metadyne $M_2$.

Stator windings 90 and 1 in pilot exciter metadyne $M_1$ are in circuit with the primary brushes $a$, $c$ thereof and winding 90 creates ampere turns in the same direction as the armature ampere turns due to the primary current. Winding 1 creates a flux inducing between the primary brushes an electromotive force in opposition to said primary current. Winding 3 is shunt connected across brushes $a$, $c$ and creates a flux inducing between said brushes an electromotive force substantially equal to the voltage of source $B_t$.

Stator winding 9 is traversed by the secondary current, being connected to brushes $b$, $d$ and compensates almost completely the armature reaction due to the secondary current. Winding 5 is traversed by current $I_p$ as indicated above, such current being equal to $k_p x$, wherein $k_p$ is a constant and $x$ is the actual value of a characteristic of the output of machine S.

Stator winding 6 is traversed by the current $I_r$ which is derived from a suitable source, such current being equal to $k_r X$, wherein $k_r$ is a constant and X is the desired value of a characteristic of the output of machine S. The ampere turns created by windings 5 and 6 are in opposition to each other. Winding 7 is energized with an auxiliary current $I_m$ derived from a suitable source and is set to create ampere turns in winding 7 equal to the difference between the ampere turns created by winding 5 when the value $x$ reaches its average value and the ampere turns created by winding 6.

Stator winding 77 is shunt connected across the brushes $b$, $d$ of pilot exciter metadyne $M_1$ and creates by its ampere turns, a primary current sufficient for inducing between said brushes a voltage substantially equal to the ohmic drop in said winding 77. Winding 2 is traversed by the secondary current and induces between the secondary brushes an electromotive force in opposition to said secondary current. Winding 4 is a shunt connected between brushes $b$, $d$ and creates a flux which induces between said secondary brushes an electromotive force substantially equal to the ohmic drop in said winding.

Under these conditions and assuming that winding 7 is not energized, the pilot metadyne $M_1$ will supply a current to winding 25 of the main metadyne $M_2$ which will reduce the resultant ampere turns of windings 5 and 6 to a relatively small amount in accordance with the equation $I_p = k_0 I_{re}$, wherein $k_0$ is a constant and $e$ is the error current. The current $e$ will be very small compared to the currents $I_p$ and $I_r$. If winding 7 is energized with current $I_m$, as described above, the value of $e$ will be further reduced. The action of pilot metadyne $M_1$ is quite rapid and for small values of the error current $e$, the stator windings 1, 2, 3, 9, 5 and 6 are essential. The use of windings 4, 7, 77 and 90 is optional.

To eliminate undesirable inductive reaction between the stator windings, a transformer F is used, the same having its primary winding in circuit with winding 6 and its secondary winding in circuit with the output of metadyne exciter $M_1$ and having a turn ratio such as to cause the total mutual induction coefficient to become zero.

The pilot metadyne $M_1$ may be caused to operate as a generator by disconnecting the battery B through switch H, short circuiting the primary brushes $a$, $c$ and rendering stator winding 3 inoperative.

Assuming that switch H is operated to connect the battery B to the primary brushes $a$, $c$ of the main exciter metadyne $M_2$, the same will operate as a transformer metadyne. Stator windings 99 and 21 are traversed by the primary current passing between the primary brushes $a$, $c$ and battery B. Winding 99 creates amperes turns in the same direction as the armature ampere turns due to the primary current or in the opposite direction, depending on the size of metadyne $M_2$. For a relatively small size machine, the ampere turns will be in the same direction while for a larger size device the ampere turns will be in opposition and the winding 99 acts as a partial primary compensating winding.

Winding 21 creates a flux inducing between the primary brushes of the main exciter metadyne $M_2$ an electromotive force opposing the primary current. Winding 23 is shunt connected across the primary brushes and induces between said brushes, an electromotive force substantially equally to the ohmic drop in said winding. Winding 22 is traversed by the secondary current passing between secondary brushes $b$, $d$ and induces an electromotive force between said brushes which opposes said current.

Winding 24 is shunt connected across the secondary brushes and induces between said brushes a voltage substantially equal to the ohmic drop of the winding. Winding 29 is in circuit with the secondary brushes, is a secondary hypocompensating winding which is traversed by the secondary current and compensates only partially the armature reaction due to said secondary current. Winding 98 is traversed by the current $I_e$ derived from device 30 as previously described and winding 97 is adapted to be energized by a current $I_n$ set to create a number of ampere turns equal to the mean value of the ampere turns created by winding 25.

Under these conditions and assuming that winding 97 is not energized, then metadyne $M_2$ will supply field winding 20 of machine S with an exciting current which is practically proportional to the secondary current output of the pilot exciter metadyne $M_1$ which traverses winding 25. If winding 97 is energized with current $I_n$, the proportionality of said exciting and secondary current output becomes even more exact. Stator windings 21, 22, 25 and 29 are essential for proper operation of the system while the use of windings 23, 24, 97, 98 and 99 is optional.

The main exciter metadyne $M_2$ may be caused to operate as a generator, rather than as a transformer, by operating switch H to disconnect battery B from the primary brushes and short circuiting said brushes and winding 23.

The current $I_e$ is an error current as above described and its controlling effect is made more precise by the action of pilot metadyne $M_1$. Through the use of winding 98, the amount of correction afforded by metadyne $M_1$ is further reduced, based on the difference between the currents $I_r$ and $I_p$.

The amplification of power in terms of the currents controlling the operation of the pilot metadyne exciter $M_1$ and the current supplied to field winding 20 of machine S is very high and may be of the order of 1 to 100,000 or 1,000,000. Accordingly, the device 30 may supply exceedingly sensitive control currents for use in the excitation system.

As shown in Fig. 2, the pilot exciter metadyne $M_1$ is similar to that shown in Fig. 1, except that windings 5 and 6 of the latter are combined in the form of winding 8 in the former. Winding 8 is adapted to be energized by the error current $I_e$ which is derived from device 30 and represents the difference between currents $I_r$ and $I_p$. The output of the metadyne $M_1$ is supplied to winding 25 of the main exciter metadyne $M_2$, as previously described.

Substantial improvement in both control and stability, is effected in accordance with the instant invention, when the synchronous machine S' is provided with a pair of excitation windings 20' and 40 which are excited by tandem metadynes, as shown in Fig. 3. The windings 20' and 40 have their magnetic axes arranged in quadrature.

The main winding 20' is excited by the interconnected pilot exciter metadyne $M_1$ and main exciter metadyne $M_2$ while the auxiliary winding 40 is excited by the interconnected pilot metadyne $M_3$ and main exciter metadyne $M_4$. For the purpose of simplification, the series and shunt windings for the metadynes $M_1$ and $M_2$, as well as the primary brush circuit connections thereof, have not been shown, although they are similar to that shown in Fig. 1.

The device 30' has an input derived from the output of machine S' and from an auxiliary synchronous generator C which is mechanically coupled to machine S'. The generator C includes an excitation winding 50. The device 30' provides a plurality of control currents including the current $I_p$ which is proportional to the actual value $x$ of a characteristic of the output of machine S'; current $I_r$ which is proportional to the value X desired of the characteristic of the output of machine S'; current $I_e$ which is the error current as described above; and currents $I_a$, $I_b$, $I_y$ and $I_z$ to be hereinafter described.

Pilot exciter metadyne $M_1$ includes stator windings 5, 6, 7, 10, 11 and 55 whose magnetic axes coincide with the commutating axis of the secondary brushes $b$, $d$ thereof while main exciter metadyne $M_2$ includes stator windings 25, 97 and 98 whose magnetic axes also coincide with the commutating axis of the secondary brushes $b$, $d$ thereof. The pilot exciter metadyne $M_3$ and main exciter metadyne $M_4$ are respectively controlled by stator windings 35, 45.

Windings 5 and 98 are respectively energized by currents $I_p$ and $I_e$ which are derived from device 30' as explained above. Windings 6, 7 and 97 are respectively energized by the currents $I_r$, $I_m$, $I_n$, as described in connection with Fig. 1. Windings 55, 10, 11 and 35 are respectively energized by currents $I_a$, $I_b$, $I_y$ and $I_z$ which are derived from device 30' and described hereinafter.

The output of the pilot exciter metadyne $M_1$ is supplied to winding 25 of main exciter metadyne $M_2$ and the output of pilot exciter metadyne $M_3$ is supplied to winding 45 of main exciter metadyne $M_4$.

For an explanation of the operation of the system shown in Fig. 3, reference is made to the diagram shown in Fig. 4. Assuming that machine S' is an alternator and therefore a synchronous generator then a vectorial analysis thereof may be made by means of Potier's diagram indicated in Fig. 4. Here, $oa$ represents the actual voltage of the generator output which is to be controlled and kept at a predetermined value equal to X. Vector $oe$ represents the load current lagging $\phi$ radians. Vector $ab$ represents the ohmic drop and $bd$ the inductive drop. Thus $od$ represents the voltage to be induced.

Consider first a conventional alternator having a single field winding which must create the necessary ampere turns for inducing the voltage $od$. The armature reacting ampere turns may be represented by the vector $of$ in phase with the load current $oe$. Vector $of$ may be resolved into two component ampere turns represented by vector $og$ in opposition with ampere turns of the field winding and $oh$ in quadrature with vector $og$. The single field winding must create ampere turns represented by vector $ok'$ in quadrature relation to vector $od$ and resolvable into component $kk'$ equal and opposite to vector $og$ and component $ok$ necessary for inducing the voltage represented by the vector $od$.

The angle B which is formed between the vectors $oa$ and $od$, represents the angle between the magnetic axes of the inductor of machine S' under load and no-load conditions. Such angle is directly related to the stability of operation of the system, the stability factor increasing with a decrease in said angle. Consider the system using two field windings as shown in Fig. 3 and assume that the current $I_z$ derived from the device 30' is of a value such as to cause the winding 40 to induce a voltage represented by vector $ap$, then the winding 20' can induce only a voltage represented by the vector perpendicular to vector $ap$, such resultant voltage must be represented by vector $od$ and the voltage induced by the winding 20' will be represented by vector $oe$ due to the current $I_p$ controlling the output of pilot exciter metadyne $M_1$.

It then becomes apparent that the characteristic angle B is then reduced to B' since the point $r$ on vector $ap$ lies at the intersection of a circle having a diameter $oa$ with the vector $ap$, such point $r$ determining vector $ol$ extending to $dl$ which is perpendicular to $ol$. If the voltage induced by the action of the control, current $I_z$ is represented by vector $aq$, then the angle B is reduced to B' since point $s$ on vector $aq$ lying on said circle determines vector $om$, $dm$ being parallel to $aq$. The said angle B may be reduced to zero as when vector $au$ lies perpendicular to $oa$. Points $p$, $q$ and $u$ lie on a circle with a diameter $ad$.

It is apparent that the excitation control shown in Fig. 3 improves stability of operation through the simultaneous action of the two field windings 20' and 40. Furthermore the control of the current energizing winding 20' is facilitated inasmuch as the variations thereof are reduced for a given variation in load and accordingly the regulation becomes more precise.

The examples given above are illustrative and it is understood that the utility of two field windings may be carried out in a number of ways, the synchronous machine being either a generator or a motor and the characteristic to be controlled may be the voltage at the output terminals, the voltage at the center of gravity of the load, the reactive power or a function of the angular lag between the voltage and current of a transmission line connected to said machine or any other variable of the machine output.

The stability of the system may also be improved by the use of the control current $I_a$ which is derived from device 30' in connection with the pilot exciter metadyne $M_1$ and which is supplied to winding 55 thereof, such current being proportional to the angle B, or by the use of the current $I_b$, also derived from device 30' and which is supplied to winding 10 of the metadyne $M_1$. These currents may also be supplied to appropriate windings on metadyne $M_3$. The current $I_b$ is proportional to the derivative of B with respect to time.

The sensing device 30' comprises well known electronic and electrical components including tubes, resistances, reactors and electro-mechanical means whereby the control currents $I_p$ or $I_e$ which represents the difference between currents $I_p$ and $I_r$, may be suitably derived. Furthermore, control currents proportional to the real or reactive power of the machine output may also be derived.

For example, a control current proportional to the output voltage may be obtained by connecting a resistor free of inductance and having a substantial resistance value, in combination with a voltage transformer, at a selected point in the line, in a manner known in the art. Similarly, a control current proportional to the current of the output is obtained by means of a current transformer. A control current proportional to the real power at a selected point in the line may be obtained by using a watt meter to regulate a resistance in a circuit providing an output current which is proportional to the power. To obtain a control current proportional to the reactive power, a watt meter having suitable connections may be used in a manner known in the art. For control currents proportional to the angular lag of the current or voltage, a phase meter may be used.

While reference may be made specifically to control currents proportional to output voltages, it is understood that such control currents may be derived from the other electrical characteristics mentioned above, and utilized in a similar manner to effect control of the excitation system of the instant invention.

Means may be provided for creating a control current which is proportional to the angle B or to the angle $\phi$, thereby providing currents $I_a$, $I_b$, as well as current $I_y$ which is proportional to vector $og$ or current $I_z$ which is proportional to vector $oh$, as indicated in Fig. 4. To this end, as shown in Fig. 5, a pair of synchronous motors 60, 62 are arranged with their shafts in alignment and bearing the respective, opposed discs 64, 65. As shown in Fig. 6, the discs 64, 65 are formed with arcuate openings indicated at 64a, 65a respectively. Assume that motor 60 having a field winding 61, is energized by the auxiliary generator C, shown in Fig. 3 and motor 62 having a field winding 63, is energized from the output of machine S' also shown in Fig. 3. The angle of the overlapping openings 64a, 65a on rotating discs 64, 65 will be proportional to the angle B.

A source of light L and a photoelectric cell P located on opposite sides of the discs 64, 65 and in alignment with the openings therein, will provide an output current from cell P which is proportional to the angle B. On varying the width of the opening 65a in disc 65, as shown at 65b in Fig. 7, any desired function of the angle B may be recorded, and the output of cell P modified accordingly.

Furthermore, by mounting a toroidal wound resistance 66 on one of the rotatable discs 64, 65 and a rolling contact 67 for engaging the resistance, on the other disc, and applying a constant current to the terminals 68 of the resistance, the voltage between said terminals will be any desired function of the angle B provided the resistance between the consecutive turns of the toroidal winding is conveniently set.

If the motor 60 is energized by the auxiliary alternator C and motor 62 is energized by a three phase system of currents in phase with the output currents at terminals $T_1$, $T_2$, and $T_3$ of the machine S', then the control current supplied by the cell P will be proportional to the angle $B+\phi$. Thus, there are obtained control currents measuring the positions of the magnetic axes of the inductor of machine S' relative to that of the armature reaction thereof. Such control currents are effective, when used as indicated above, to improve the stability of operation of the machine. With the arrangement of elements shown, the control currents $I_a$, $I_b$, $I_p$, $I_y$ and $I_z$, may be readily obtained.

The precision of regulation of the electrical characteristic of the output of machine S' is primarily dependent on the operation of the metadyne exciters $M_1$ and $M_2$, and to a lesser extent on the exciters $M_3$ and $M_4$. Accordingly, the two exciters $M_3$ and $M_4$ may be replaced by a single exciter in circuit with the winding 40. In such case, the single exciter is connected in a manner similar to that of pilot exciter metadyne $M_1$.

It is understood that similar excitation systems may be used for the stator windings of a metadyne, wherein such stator windings are in quadrature relationship.

Having thus disclosed my invention, I claim as new and desire to protect by Letters Patent:

1. An excitation system for an electrical machine having an excitation winding, comprising a main exciter metadyne having a pair of primary brushes, a pair of secondary brushes displaced from said primary brushes and providing an output excitation current, and a plurality of control windings, circuit means connecting said secondary brushes with said excitation winding, and a pilot exciter metadyne for controlling the output current of said main exciter metadyne, said pilot exciter metadyne having a pair of primary brushes, a pair of secondary brushes displaced relative to said primary brushes, and a plurality of control windings, circuit means connecting said last mentioned secondary brushes to one control winding of the main exciter metadyne, means for sensing the output of said electrical machine to provide a control current proportional to an electrical characteristic of said output, and circuit means connecting said sensing means and one of the control windings of said pilot exciter metadyne.

2. A system as in claim 1, and further including circuit means connecting another of the control windings of said pilot exciter metadyne in series with the secondary brushes thereof for substantially compensating the armature reaction due to current traversing said secondary brushes.

3. A system as in claim 2, and further including circuit means connecting another of the control windings of said main exciter metadyne in series with the secondary brushes thereof for partially compensating the armature reaction due to current traversing said secondary brushes.

4. A system as in claim 1, and further including means operative to provide a control current proportional to a predetermined value of the electrical characteristic of the output of said machine, circuit means connecting said last mentioned means and another of the control windings of said pilot exciter metadyne, the first and second mentioned control windings of the pilot exciter metadyne being arranged relative to each other with their respective ampere turns in opposition to each other.

5. A system as in claim 1, and further including means for deriving a control current proportional to the difference between a predetermined value of an electrical characteristic of the output of said machine and the actual value of said characteristic, and circuit means connecting said last mentioned means and another of the control windings of said main exciter metadyne.

6. A system as in claim 1 wherein another of the control windings of said pilot exciter metadyne is adapted to be energized by a control current to create ampere turns equal to the mean value of the ampere turns created by said one control winding of the pilot exciter metadyne.

7. A system as in claim 1, wherein another of the control windings of said main exciter metadyne is adapted to be energized by a control current to create ampere turns equal to the mean value of the ampere turns created by said one control winding of the main exciter metadyne.

8. A system as in claim 1, and further including means for deriving a control current proportional to a function of the relative positions of the magnetic axes of the inductor of said electrical machine and of the armature reaction thereof, and circuit means connecting said last mentioned means with another of the control windings of said pilot exciter metadyne.

9. An excitation system for an electrical machine having a pair of excitation windings in quadrature relation to each other, comprising a pair of main exciter metadynes having their respective outputs connected to the respective excitation windings, a pair of pilot exciter metadynes respectively controlling the outputs of said main exciter metadynes, one of said pilot exciter metadynes including a plurality of control stator windings, one of said control windings being energized by a current proportional to the actual voltage value of the output of said machine, a second control winding being energized by a current proportional to a desired voltage value of the output of said machine, and a third control winding energized by a current which is a predetermined function of the angle formed by the relative positions of the magnetic axes of the inductor of said machine when said machine operates under load and no-load conditions, the main exciter metadyne controlled by said one pilot exciter metadyne including a control stator winding energized by a current proportional to the difference between the actual and desired voltage values of the output of said machine.

10. A system as in claim 9 and further including an auxiliary synchronous generator mechanically coupled to said machine, a pair of synchronous motors, one of said motors being energized by said auxiliary synchronous generator, the other of said motors being energized by the output of said machine, and means operative to supply a control current for said one pilot exciter metadyne in response to the relative angular displacement of the axially aligned shafts of said pair of motors.

References Cited in the file of this patent

"Metadyne Statics," by M. Pestarini, John Wiley & Sons, Inc., New York (1952) (pp. 280, 281 and chapter 17, sections 1 and 2 relied on).